E. G. WATROUS.
TIRE FASTENER.
APPLICATION FILED AUG. 3, 1908.
1,051,975.
Patented Feb. 4, 1913.
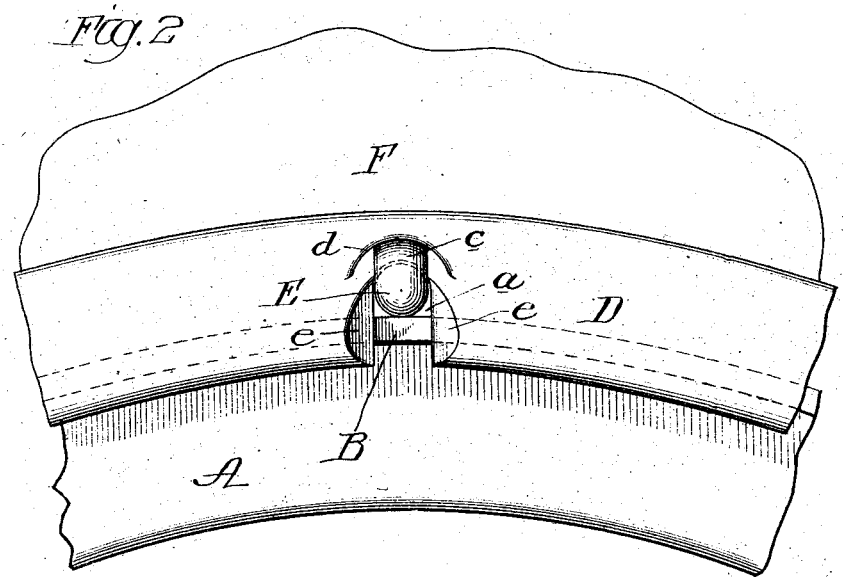
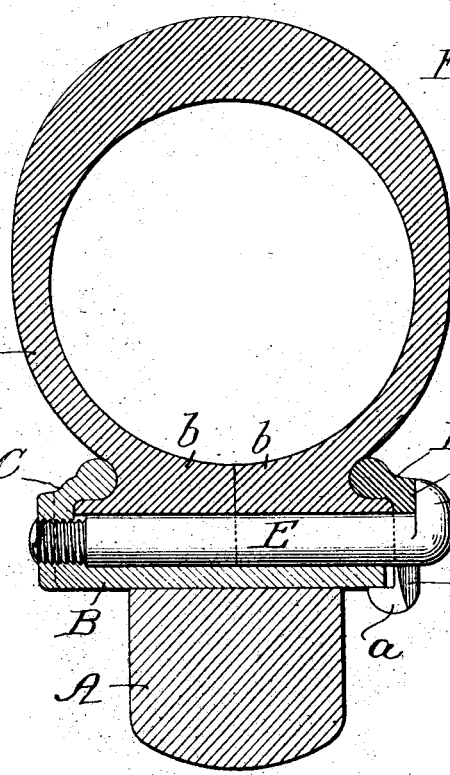
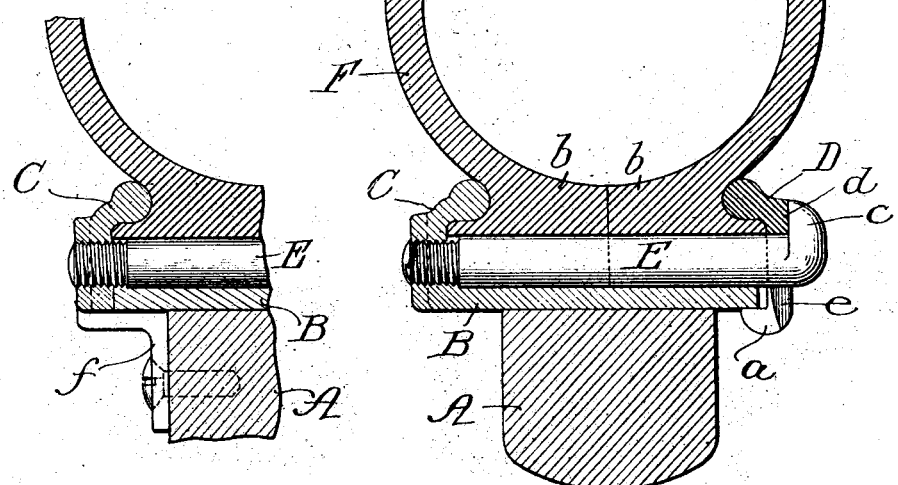

UNITED STATES PATENT OFFICE.

EARL G. WATROUS, OF CHICAGO, ILLINOIS.

TIRE-FASTENER.

1,051,975.　　　　　Specification of Letters Patent.　　Patented Feb. 4, 1913.

Application filed August 3, 1908. Serial No. 446,504.

*To all whom it may concern:*

Be it known that I, EARL G. WATROUS, a citizen of the United States, residing at Chicago, in the county of Cook and State of Illinois, have invented a certain new and useful Improvement in Tire-Fasteners, of which the following is a description, reference being had to the accompanying drawing, forming part of this specification.

My invention relates more particularly to pneumatic tires such as are generally used on automobiles at the present time, and has for its object the provision of a novel and simple fastening means by which the tire can be securely attached to the wheel and be readily detached therefrom. Its novelty will be hereinafter more fully set forth and particularly pointed out in the claims.

In the accompanying drawings, Figure 1 is a cross sectional view through the rim of a wheel having a tire secured thereto by my improved fastening means; Fig. 2 a detail side elevation of the same; and Fig. 3 a sectional detail of a modification.

The felly A of the wheel has permanently secured to it, by any suitable means, a metal rim B provided at one side with an integrally formed annular flange or ring C. At the opposite side of the wheel there is provided a detachable ring D corresponding in its general shape to the ring C but extending radially inward toward the axis of the wheel, beyond the inner surface of the rim B, and having its inner edge inturned to hook under and engage the edge of the rim which projects beyond the outer face of the felly, as shown. At suitable intervals around the circumference of the wheel the ring D is provided with slots $a$, Fig. 2, opposite and coincident with which slots the ring C is provided with threaded openings for the reception of the threaded ends of screws bolts E which are inserted from the outer side of the wheel through the slot $a$. The tire F is provided with a divided base $b$ $b$ of suitable shape to fit snugly between the rings C and D and against the rim B, and said base is provided with transverse slots to accommodate the bolts E. The outer ends of the bolts are provided with heads $c$ preferably of approximately the shape shown, projecting in one direction only from the axis of the bolt and of approximately the same width or thickness as the diameter of the bolt, being slightly less than the width of the slots $a$. The ring D is provided with bosses $d$ around the outer ends of the slots $a$ to afford suitable bearing surfaces for the heads $c$ of the bolts E; and the walls of the slots $a$ are beveled off to form outwardly flaring or inclined cam surfaces $e$, Fig. 2. The ring C is also provided with bosses around the bolt holes for the bolts E, to provide a suitable thickness of metal at such points.

Under the construction above described, and with the tire secured in place upon the wheel as in the drawing, all that is necessary, in order to detach the tire, is to turn each of the bolts E a half revolution, to bring their heads $c$ into registry with the slots $a$, and then remove the ring D. The tire may then be slipped bodily outward off the wheel; or its outer half may be sprung outward, off the rim, to permit access to the interior of the tire, for the removal and replacement of the usual inner tube, without entirely removing the tire from the wheel.

To replace the tire and again secure it to the wheel, it is only necessary to set it back into position on the wheel, replace the ring D, and then turn the bolts E back to normal position, at which operation the heads of the bolts will ride over the cam surfaces $e$ of the slots $a$ and force the ring D inward to normal position, to again clamp the tire securely in place.

The particular form of the rings C and D, and consequently the particular shape of the base of the tire which fits between them, is not material, so long as it is such as to cause the rings to securely grip and hold the tire in place upon the rim when the bolts E are tightened up as described. Furthermore, while I consider it the better construction to form the ring C integrally upon the rim B, as a flange thereof, there being no occasion to remove it in detaching the tire, nevertheless it may be formed separately, if desired, or it may be shaped as in Fig. 3 and provided with ears $f$ fitting against and secured to the felly A, to hold the ring in place when the tire is detached.

The only tire fasteners of this general character in practical use, so far as I am aware, are fasteners in which clamping rings engaging the opposite sides of the base of the tire are held in place and gripped to the tire and rim of the wheel by ordinary screw bolts having the usual integral heads at one end and clamping nuts applied to their threaded opposite ends. Under such construction it is necessary to unscrew and completely remove the nuts of all the bolts, before the clamping rings can be removed and the tire detached; whereas under my improved construction the work may be much more quickly accomplished by giving each bolt merely a half turn, as described, without the necessity of removing or detaching any nuts or bolts at all.

Having thus fully described my invention, I claim:

1. In a wheel, the combination, with the rim B and tire F, of the rings C and D and the bolts E, the ring D being provided with the slots $a$ and cam surfaces $e$, and the bolts E being provided with the heads $c$ coöperating with said slots and cam surfaces and with the ring D in the manner and for the purpose described.

2. In a wheel, the combination, with the rim B having the flange or ring C, and the tire F, of the ring D and the bolts E, the ring D having its inner edge hooked under and engaged with the rim B, and being provided with the slots $a$ extending inwardly through its hooked inner edge, and the bolts E intermediate of the hooked inner edge and the outer edge of the ring and having the heads $c$ coöperating with said slots and with the ring in the manner and for the purpose described.

EARL G. WATROUS.

Witnesses:
EDWARD RECTOR,
LOUIS B. ERWIN.